US012069539B2

United States Patent
Priyanto et al.

(10) Patent No.: US 12,069,539 B2
(45) Date of Patent: Aug. 20, 2024

(54) METHODS AND DEVICES FOR COORDINATED UPLINK-BASED POSITIONING

(71) Applicant: Sony Group Corporation, Tokyo (JP)

(72) Inventors: Basuki Priyanto, Lund (SE); Anders Berggren, Lund (SE); Peter Karlsson, Lund (SE)

(73) Assignee: Sony Group Corporation, Tokyo (JP)

( * ) Notice: Subject to any disclaimer, the term of this patent is extended or adjusted under 35 U.S.C. 154(b) by 370 days.

(21) Appl. No.: 17/423,520

(22) PCT Filed: Feb. 12, 2020

(86) PCT No.: PCT/US2020/017838
§ 371 (c)(1),
(2) Date: Jul. 16, 2021

(87) PCT Pub. No.: WO2020/167890
PCT Pub. Date: Aug. 20, 2020

(65) Prior Publication Data
US 2022/0124457 A1    Apr. 21, 2022

(30) Foreign Application Priority Data

Feb. 15, 2019    (SE) .................................. 1930061-5

(51) Int. Cl.
*H04W 4/029*    (2018.01)
*H04L 5/00*    (2006.01)
(Continued)

(52) U.S. Cl.
CPC ........... *H04W 4/029* (2018.02); *H04L 5/0048* (2013.01); *H04W 24/08* (2013.01); *H04W 24/10* (2013.01)

(58) Field of Classification Search
CPC ..... H04W 4/029; H04W 24/08; H04W 24/10; H04W 64/00; H04L 5/0048; H04L 5/0035; H04L 5/0094
See application file for complete search history.

(56) References Cited

U.S. PATENT DOCUMENTS

2015/0011236 A1    1/2015 Kazmi et al.
2015/0215107 A1    7/2015 Siomina
(Continued)

FOREIGN PATENT DOCUMENTS

CA    3068745 A1    2/2019
CN    104838687 A    8/2015
(Continued)

OTHER PUBLICATIONS

NR beam management supporting multi-gNB measurements for positioning, 3GPP TSG RAN WG1 Meeting #95, R1-1813583, Spokane, US, Nov. 12-16, 2018 (Year: 2018).*
(Continued)

*Primary Examiner* — Ayaz R Sheikh
*Assistant Examiner* — David Zhijun Sun
(74) *Attorney, Agent, or Firm* — Tucker Ellis LLP

(57) ABSTRACT

For uplink-based positioning, a transmission of an uplink reference signal via a transmit beam at a user equipment (UE) (100) is coordinated with a respective receive beams at one or more receivers (110). A positioning computation node (105) sends configuration information to the UE (100) and to the one or more receivers (110). The configuration information enables the receivers (110) to configure receive beams (111) to receive the uplink reference signal transmission from the UE (100). The receivers (110) perform various measurements of the uplink reference signal and report the
(Continued)

measurements as well as beam information to the positioning computation node (105), which generates a position estimate.

20 Claims, 8 Drawing Sheets

(51) Int. Cl.
*H04W 24/08* (2009.01)
*H04W 24/10* (2009.01)

(56) References Cited

U.S. PATENT DOCUMENTS

| | | | |
|---|---|---|---|
| 2017/0280415 | A1 | 9/2017 | Kim et al. |
| 2017/0366244 | A1 | 12/2017 | Lee et al. |
| 2018/0098187 | A1 | 4/2018 | Blankenship et al. |
| 2018/0115358 | A1 | 4/2018 | Raghavan et al. |
| 2018/0324738 | A1 | 11/2018 | Stirling-Gallacher et al. |
| 2019/0327060 | A1* | 10/2019 | Liu .................. H04B 7/088 |
| 2021/0337496 | A1* | 10/2021 | Da .................... H04W 56/006 |
| 2021/0400620 | A1* | 12/2021 | Tao ..................... H04W 4/025 |

FOREIGN PATENT DOCUMENTS

| | | | | |
|---|---|---|---|---|
| CN | 105493585 | A | 4/2016 | |
| CN | 106304328 | A | 1/2017 | |
| CN | 106576272 | A | 4/2017 | |
| WO | WO-2014021766 | A2 | 2/2014 | |
| WO | WO-2015080645 | A1 | 6/2015 | |
| WO | 2015096074 | A1 | 7/2015 | |
| WO | WO-2018023646 | A1 * | 2/2018 | ............ H04W 16/28 |
| WO | 2018070911 | A1 | 4/2018 | |
| WO | 2018083861 | A1 | 5/2018 | |
| WO | WO-2019022657 | A1 | 1/2019 | |

OTHER PUBLICATIONS

Aspects of UL-based NR positioning techniques, 3GPP TSG RAN WG1 Meeting AH-1901, R1-1901183, Taipei, Taiwan, Jan. 21-25, 2019 (Year: 2019).*

Fraunhofer IIS, Fraunhofer HHI,NR beam management supporting multi-gNB measurements for positioning [online], 3GPP TSG RAN WG1 Meeting #95 R1-1813583, Nov. 12, 2018.

Catt, NR RAT-dependent UL Positioning[online], 3GPP TSG RAN WG1 Ad-Hoc Meeting #AH_1901 R1-1900311, Jan. 12, 2019.

HTC, Miscelleanous corrections to LPP stage 2[online], 3GPP TSG RAN WG2 Meeting :j:j: 70 R2-103410, May 14, 2010.

Intel Corporation, Summary of Contributions and Initia 1 Outcome of Offline Discussion for NR-Positioning AI—7. 2. 10. 1. 2 UL only based positioning [online], 3GPP T SG RAN WG1 Ad-Hoc Meeting #AH_1901 R1-1901423, Jan. 24, 2019.

Sony, Considerations on UL-based Positioning in NR[on line], 3GPP TSG RAN WG1 Meeting #96 R1-1902189, Internet<URL:http://www.3gpp.org/ftp/tsg_ran/WG1_RL1/TSGR1_96/Docs/R1-1902189.zip), Feb. 16, 2019.

International Search Report and Written Opinion from corresponding International Application No. PCT/US2020/017838 mailed on Jun. 23, 2020, 11 pages.

Office Action from corresponding Swedish Application No. 1930061-5 mailed on Aug. 9, 2019.

Vivo, "Considerations on techniques for NR positioning" 3GPP tsg_ran\wg1_rl1, Tsgr1_ 95 issues ~, R1-1812337, Nov. 12, 2018.

* cited by examiner

METHODS AND DEVICES FOR COORDINATED UPLINK-BASED POSITIONING

RELATED APPLICATION DATA

This application claims the benefit of Swedish Patent Application No. 1930061-5, filed Feb. 15, 2019, the entirety of which is incorporated herein by reference.

TECHNICAL FIELD OF THE INVENTION

The technology of the present disclosure relates generally to operation of a wireless communications device in a wireless communications network and, more particularly, to a method and apparatus for uplink-based positioning.

BACKGROUND

In existing wireless communications systems (e.g., 3G or 4G-based systems), estimations of a device position are generally considered acceptable when regulatory positioning requirements are satisfied. For example, for emergency calls, a position estimate is only required to be accurate within 50 meters in 4G systems. Positioning is an important feature under consideration of the Third Generation Partnership Project (3GPP) for 5G systems such as New Radio (NR). The specification is targeting use cases beyond emergency call services (i.e. regulatory requirements), such as commercial use-cases and 5G systems may be expected to provide sub-meter positioning accuracy.

Cellular-based positioning may be downlink based or uplink based or the combination of both. One approach in legacy systems for uplink-based positioning is uplink time difference of arrival (UTDOA). With this approach, a user equipment (UE) transmits a reference signal, which is received by one or more base stations or dedicated location measurement units (LMUs). The base stations (or LMUs) estimate a time of arrival and report the estimate to a location server to estimate the UE's position (e.g. via multilateration if multiple base stations measure a time of arrival).

Legacy cellular-based positioning methods typically involve omnidirectional antennas at the UE and base station. However, 5G systems contemplate multiple-beam operations in the UE as a transmitter and base stations as receivers, especially in higher frequency range (e.g. mmWave frequency). Therefore, the legacy cellular-based positioning methods are not easily applicable to 5G cellular systems.

SUMMARY

For uplink-based positioning, multiple-beam operations may disrupt time of arrival measurements by base stations, particularly neighboring base stations. The disclosed approach provides coordination between a UE transmitting an uplink reference signal for positioning via one or more UE transmit beams and base stations (and/or location management units (LMUs)) receiving the uplink reference signal via one or more receive beams. A positioning computation node sends configuration information to the UE and to a set of receivers (e.g. base stations and/or LMUs) participating in uplink-based positioning. The configuration information enables the receivers to configure receive beams to receive the uplink reference signal transmission from the UE. The receivers may perform various measurements of the reference signal and report the measurements as well as beam information to the positioning computation node. The beam information indicates directionality of transmissions and may provide angle information to improve accuracy of positioning estimates.

According to one aspect of the disclosure, a method, performed by a wireless communications device, for uplink-based positioning, includes receiving configuration information for uplink-based positioning from a positioning computation node, wherein the configuration information provides coordination between transmit beams at the wireless communications device and respective receive beams at a set of participating radio access network (RAN) nodes; and transmitting an uplink reference signal to the set of participating RAN nodes in accordance with the configuration information.

According to one embodiment of the method, the method includes receiving a request for positioning from the positioning computation node; measuring (178) downlink reference signals received from a plurality of RAN nodes; and transmitting (180) a channel quality measurement report, associated with the downlink reference signals received, to the positioning computation node.

According to one embodiment of the method, the request for positioning further indicates a desired accuracy.

According to one embodiment of the method, transmitting the uplink reference signal occurs within a predetermined time period from the measuring of the downlink reference signals or the transmitting of the channel quality measurement report.

According to one embodiment of the method, the method includes selecting a set of RAN nodes from the plurality of RAN nodes for inclusion in the channel quality measurement report.

According to one embodiment of the method, selecting of the set of RAN nodes is based on the desired accuracy and/or respective measurements associated with the plurality of RAN nodes.

According to one embodiment of the method, the channel quality measurement report includes a measurement value with associated beam information for downlink reference signals received.

According to one embodiment of the method, the beam information includes transmit beam information associated with the downlink reference signals included in the channel quality measurement report and/or receive beam information of the wireless communications device.

According to one embodiment, the method includes receiving resource allocation information from a serving RAN node for transmitting the uplink reference signal to the set of participating RAN nodes.

According to one embodiment of the method, the configuration information indicates a beam pattern for transmitting uplink reference signals to the set of participating RAN nodes.

According to one embodiment, the method includes sending a transmit beam configuration of the wireless communications device to the positioning computation node.

According to one aspect of the disclosure, a method for uplink-based positioning performed by a radio access network (RAN) node includes receiving configuration information for uplink-based positioning from a positioning computation node, wherein the configuration information provides coordination between a transmit beam of an uplink reference signal from a wireless communications device and a receive beam at the RAN node; configuring the receive beam at the RAN node to receive the uplink reference signal from the wireless communications device in accordance with the configuration information; measuring the uplink reference signal received; and sending a positioning measurement report for the uplink reference signal received to the positioning computation node.

According to one embodiment of the method, the configuration information indicates at least beam information for receiving the uplink reference signal.

According to one embodiment of the method, the positioning measurement report includes a timing measurement, a power measurement, and/or beam information for the uplink reference signal received.

According to one embodiment, the method include allocating uplink resources to the wireless communications device based on the configuration information.

According to one embodiment of the method, the configuration information includes timing information and resources are allocated to the wireless communications device so that uplink reference signal transmissions occur in accordance with the timing information.

According to one embodiment of the method, sending the positioning measurement report includes collecting measurement reports from one or more neighboring RAN nodes and sending an aggregate measurement report to the positioning computation node.

According to one embodiment, the method includes sending a receive beam configuration of the RAN node to the positioning computation node.

According to another aspect of the disclosure, a method for uplink-based positioning performed by a positioning computation node includes receiving a channel quality measurement report from a wireless communications device that provides measurements of downlink reference signals from a set of network nodes; determining a configuration for uplink-based positioning, based on the channel quality measurement report from the wireless communications device, wherein the configuration provides coordination between transmit beams of uplink reference signals from the wireless communications device and respective receive beams by one or more network nodes selected from the set of network nodes; sending first configuration information to the one or more network nodes selected and second configuration information to the wireless communications device; receiving respective positioning measurement reports, associated with uplink reference signal transmissions by the wireless communications device, from the one or more network nodes; and estimating a position of the wireless communications device based on the positioning measurement reports.

According to one embodiment of the method, the configuration further includes a threshold time within which transmission of the uplink reference signals occurs, the threshold time is defined based on one of a time when the channel quality measurement report is received or a time at which channel quality measurements by the wireless communications device occurred.

According to one embodiment, the method includes receiving respective beam configurations from the wireless communications device and the set of network nodes.

According to one embodiment, the method includes sending a positioning request to a serving network node of the wireless communications device, wherein the positioning request indicates a desired accuracy.

According to one embodiment of the method, determining the configuration information further comprises selecting the one or more network nodes participating in the uplink-based positioning based on the channel quality measurement report from the wireless communications device.

According to one embodiment of the method, the second configuration information indicates uplink timing information and/or transmit beam information for one or more uplink reference signal transmissions from the wireless communications device.

According to one embodiment of the method, the first configuration information indicates respective timing information and receive beam information for the one or more network nodes participating in the uplink-based positioning.

According to another aspect of the disclosure, a wireless communications node configured to operate in a wireless communications network includes a wireless interface over which wireless communications with one or more network nodes are carried out; and a control circuit configured to: receive configuration information for uplink-based positioning from a positioning computation node, wherein the configuration information provides coordination between transmit beams at the wireless communications device and respective receive beams at a set of participating RAN nodes; and transmit an uplink reference signal to the set of participating RAN nodes in accordance with the configuration information.

According to one embodiment of the wireless communications device, the control circuit is further configured to receive a request for positioning from the positioning computation node; measure downlink reference signals received from a plurality of RAN nodes; and transmit a channel quality measurement report, associated with the downlink reference signals received, to the positioning computation node.

According to one embodiment of the wireless communications device the request for positioning further indicates a desired accuracy.

According to one embodiment of the wireless communications device, the uplink reference signal is transmitted within a predetermined time period from a time at which the downlink reference signals are measured or a time at which the channel quality measurement report is transmitted.

According to one embodiment of the wireless communications device, the control circuit is further configured to select a set of RAN nodes from the plurality of RAN nodes for inclusion in the channel quality measurement report.

According to one embodiment of the wireless communications device the set of RAN nodes is selected based on the desired accuracy and/or respective measurements associated with the plurality of RAN nodes.

According to one embodiment of the wireless communications device, the channel quality measurement report includes a measurement value with associated beam information for downlink reference signals received.

According to one embodiment of the wireless communications device, the beam information includes transmit beam information associated with the downlink reference signals included in the channel quality measurement report and/or receive beam information of the wireless communications device.

According to one embodiment of the wireless communications device, wherein the control circuit is further configured to receive resource allocation information from a serving RAN node for transmitting the uplink reference signal to the set of participating RAN nodes.

According to one embodiment of the wireless communications device, the configuration information indicates a beam pattern for transmitting uplink reference signals to the set of participating RAN nodes.

According to one embodiment of the wireless communications device, the control circuit is further configured to send a transmit beam configuration of the wireless communications device to the positioning computation node.

According to another aspect of the disclosure, a network node configured to operate in a wireless communications network includes a wireless interface over which wireless communications with a wireless communications device are carried out; an interface over which communications with a core network are carried out; and a control circuit configured to: receive configuration information for uplink-based positioning from a positioning computation node, wherein the configuration information provides coordination between a transmit beam of an uplink reference signal from a wireless communications device and a receive beam at the network node; configure the receive beam at the network node to receive the uplink reference signal from the wireless communications device in accordance with the configuration information; measure the uplink reference signal received; and send a positioning measurement report for the uplink reference signal received to the positioning computation node.

According to one embodiment of the network node, the configuration information indicates at least beam information for receiving the uplink reference signal.

According to one embodiment of the network node, the positioning measurement report includes a timing measurement, a power measurement, and/or beam information for the uplink reference signal received.

According to one embodiment of the network node, the control circuit is further configured to allocate uplink resources to the wireless communications device based on the configuration information.

According to one embodiment of the network node, the configuration information includes timing information and resources are allocated to the wireless communications device so that uplink reference signal transmissions occur in accordance with the timing information.

According to one embodiment of the network node, the control circuit is further configured to collect measurement reports from one or more neighboring RAN nodes and send an aggregate measurement report to the positioning computation node.

According to one embodiment of the network node, the control circuit is further configured to send a receive beam configuration of the network node to the positioning computation node.

According to another aspect of the disclosure, a positioning computation node configured to operate in a wireless communications network includes an interface over which communications with a plurality of network nodes and a wireless communications device are carried out; and a processor configured to: receive a channel quality measurement report from the wireless communications device that provides measurements of downlink reference signals from a set of network nodes; determine a configuration for uplink-based positioning, based on the channel quality report received from the wireless communications device, wherein the configuration provides coordination between transmit beams of uplink reference signals from the wireless communications device and respective receive beams by one or more network nodes selected from the set of network nodes; send first configuration information to the one or more network nodes selected and second configuration information to the wireless communications device; receive respective positioning measurement reports, associated with uplink reference signal transmissions by the wireless communications device, from the one or more network nodes; and estimate a position of the wireless communications device based on the positioning measurement reports.

According to one embodiment of the positioning computation node, the configuration further includes a threshold time within which transmission of the uplink reference signals occurs, the threshold time is defined based on one of a time when the channel quality measurement report is received or a time at which channel quality measurements by the wireless communications device occurred.

According to one embodiment of the positioning computation node, the processor is further configured to receive respective beam configurations from the wireless communications device and the set of network nodes.

According to one embodiment of the positioning computation node, the processor is further configured to send a positioning request to a serving network node of the wireless communications device, wherein the positioning request indicates a desired accuracy.

According to one embodiment of the positioning computation node, the processor is further configured to select the one or more network nodes participating in the uplink-based positioning based on the channel quality measurement report from the wireless communications device.

According to one embodiment of the positioning computation node, the second configuration information indicates uplink timing information and/or transmit beam information for one or more uplink reference signal transmissions from the wireless communications device.

According to one embodiment of the positioning computation node, the first configuration information indicates respective timing information and receive beam information for the one or more network nodes participating in the uplink-based positioning.

DETAILED DESCRIPTION OF EMBODIMENTS

Figure 1:
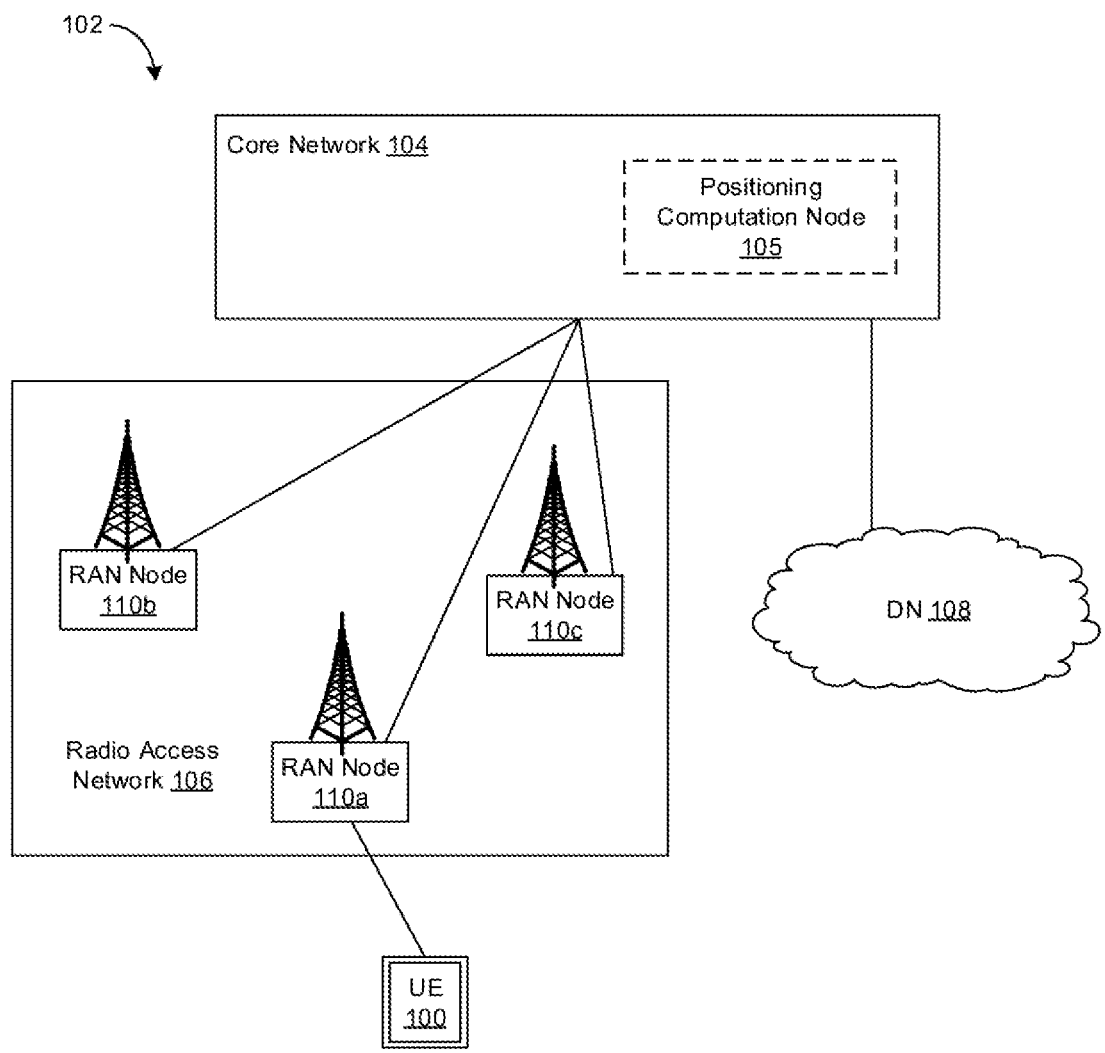
FIG. 1 is a schematic block diagram of a representative operational network environment for a wireless communications device, also referred to as a user equipment (UE).

Embodiments will now be described with reference to the drawings, wherein like reference numerals are used to refer to like elements throughout. It will be understood that the figures are not necessarily to scale. Features that are described and/or illustrated with respect to one embodiment may be used in the same way or in a similar way in one or more other embodiments and/or in combination with or instead of the features of the other embodiments.

System Architecture

FIG. 1 is a schematic diagram of an exemplary network environment in which the disclosed techniques are implemented. It will be appreciated that the illustrated network environment is representative and other environments or systems may be used to implement the disclosed techniques. Also, various functions may be carried out by a single device, such as by a radio access node, user equipment, or core network node, may be carried out in a distributed manner across nodes of a computing environment.

The network environment is relative to an electronic device, such as a user equipment (UE) 100. As contemplated by 3GPP standards, the UE may be a mobile radiotelephone (a "smartphone"). Other exemplary types of UEs 100 include, but are not limited to, a gaming device, a media player, a tablet computing device, a computer, a camera, and an internet of things (IoT) device. Since aspects of the disclosed techniques may be applicable to non-3GPP networks, the UE 100 may be more generically referred to as a wireless communications device or a radio communications device.

The network environment includes a wireless communications network 102 that may be configured in accordance with one or more 3GPP standards, such as a 3G network, a 4G network or a 5G network. The disclosed approaches may apply to other types of networks. In one embodiment, the wireless communications network 102 may utilize beam-based signal transmissions, which may not be available in 3G or 4G networks. Nonetheless, coordination aspects disclosed herein may be applicable to network which do not utilize multiple-beam operations.

In instances where the network 102 is a 3GPP network, the network 102 includes a core network (CN) 104 and a radio access network (RAN) 106. The core network 104 provides an interface to a data network (DN) 108. The DN 108 represents operator services, connection to the Internet, third party services, etc. Details of the core network 104 are omitted for simplicity of description, but it is understood that the core network 104 includes one or more servers that host a variety of network management functions, examples of which include, but are not limited to, a user plane function (UPF), a session management function (SMF), a core access and mobility management function (AMF), an authentication server function (AUSF), a network exposure function (NEF), a network repository function (NRF), a policy control function (PCF), a unified data management (UDM), an application function (AF), and a network slice selection function (NSSF). In addition, the core network 104 may include a positioning computation node 105 configured to estimate a position of UE 100 based on measurements reported by the UE 100 for downlink-based positioning and/or measurements reported by the RAN 106, for example, with uplink-based positioning. As described later, the positioning computation node 105 may obtain other information form the UE 100 and/or RAN 106 to support and coordinate uplink-based positioning. Further, while shown in FIG. 1 as being included in the core network 104, the positioning computation node 105 may be included in any network node, including nodes of RAN 106, or device, such as UE 100.

The RAN 106 includes a plurality of RAN nodes 110. In the illustrated example, there are three RAN nodes 110a, 110b, and 110c. Fewer than or more than three RAN nodes 110 may be present. For 3GPP networks, each RAN node 110 may be a base station such as an evolved node B (eNB) base station or a 5G generation gNB base station. The RAN node 110 may include one or more than one Tx/Rx point (TRP). Since aspects of the disclosed techniques may be applicable to non-3GPP networks, the RAN nodes 110 may be more generically referred to as network access nodes, an alternative example of which is a WiFi access point.

A radio link may be established between the UE 100 and one of the RAN nodes 110 for providing wireless radio services to the UE 100. The RAN node 110 to which the radio link is established will be referred to as the serving RAN node 110 or serving base station. Other RAN nodes 110 may be within communication range of the UE 100. The RAN 106 is considered to have a user plane and a control plane. The control plane is implemented with radio resource control (RRC) signaling between the UE 100 and the RAN node 110. Another control plane between the UE 100 and the core network 104 may be present and implemented with non-access stratum (NAS) signaling.

Figure 2:
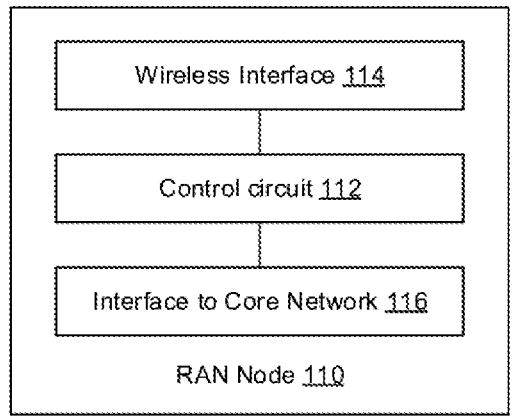
FIG. 2 is a schematic block diagram of a radio access network (RAN) node from the network environment.

With additional reference to FIG. 2, each RAN node 110 typically includes a control circuit 112 that is responsible for overall operation of the RAN node 110, including controlling the RAN node 110 to carry out the operations described in herein. In an exemplary embodiment, the control circuit may include a processor (e.g., a central processing unit (CPU), microcontroller, or microprocessor) that executes logical instructions (e.g., lines of code, software, etc.) that are stored by a memory (e.g., a non-transitory computer readable medium) of the control circuit 112 in order to carry out operation of the RAN node 110.

The RAN node 110 also includes a wireless interface 114 for establishing an over the air connection with the UE 100. The wireless interface 114 may include one or more radio transceivers and antenna assemblies to form the TRP(s). The RAN node 110 also includes an interface 116 to the core network 104. The RAN node 110 also includes an interface (not shown) to one or more neighboring RAN nodes 110 for conducting network coordination in the RAN 106.

In accordance with a further aspect, uplink-based positioning may involve a location measurement unit (LMU). The LMU may be a separate node (e.g. within the RAN 106) or it may be co-located with or a component of the RAN node 110. For example, the LMU may be a computer-based system communicatively coupled with and positioned near the RAN node 110. Alternatively, the LMU may be integrated into the RAN node 110 and may be implemented in by the logical instructions stored in the memory of the control circuit 112.

Figure 3:
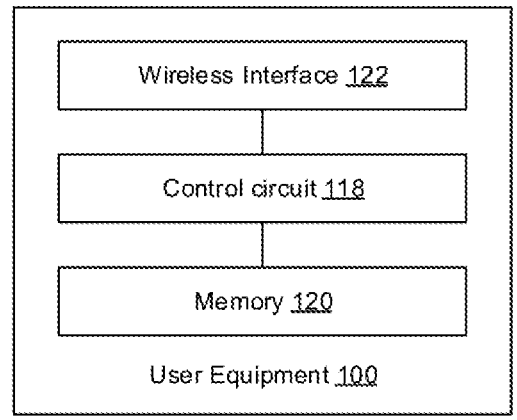
FIG. 3 is a schematic block diagram of the UE from the network environment.

With additional reference to FIG. 3, illustrated is a schematic block diagram of the UE 100. The UE 100 includes a control circuit 118 that is responsible for overall operation of the UE 100, including controlling the UE 100 to carry out the operations described herein. In an exemplary embodiment, the control circuit 118 may include a processor (e.g., a central processing unit (CPU), microcontroller, or microprocessor) that executes logical instructions (e.g., lines of code, software, etc.) that are stored by a memory (e.g., a non-transitory computer readable medium) of the control circuit 118 or a separate memory 120 in order to carry out operation of the UE 100.

The UE 100 includes a wireless interface 122, such as a radio transceiver and antenna assembly, for establishing an over the air connection with the serving base station 110. In some instances, the UE 100 may be powered by a rechargeable battery (not shown). Depending on the type of device, the UE 100 may include one or more other components. Other components may include, but are not limited to, sensors, displays, input components, output components, electrical connectors, etc.

Figure 4:
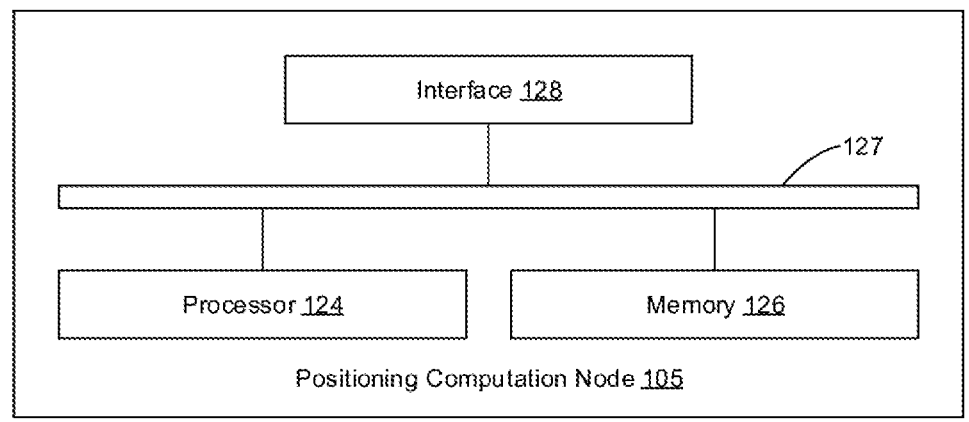
FIG. 4 is a schematic block diagram of a positioning computation node from the network environment.

In FIG. 4, a schematic block diagram of an exemplary embodiment of a positioning computation node 105 is illustrated. The positioning computation node 105 executes logical instructions (e.g., in the form of one or more software applications) to generate positioning estimates. It is to be understood, however, that aspects of the positioning computation node 105 may be distributed across various nodes of the core network 104 or another computing environment.

The positioning computation node 105 may be implemented as a computer-based system that is capable of executing computer applications (e.g., software programs) that carry out functions of the computation node 105. As is typical for a computer platform, the positioning computation node 105 may include a non-transitory computer readable medium, such as a memory 126 that stores data, information sets and software, and a processor 124 for executing the software. The processor 124 and the memory 126 may be coupled using a local interface 127. The local interface 127 may be, for example, a data bus with accompanying control bus, a network, or other subsystem. The computation node 105 may have various input/output (I/O) interfaces for operatively connecting to various peripheral devices, as well as one or more interfaces 128. The interface 128 may include for example, a modem and/or a network interface card. The communications interface 128 may enable the computation node 105 to send and receive data signals to and from other computing devices in the core network 104, the RAN 106, and/or in other locations as is appropriate.

Coordinated Uplink-Based Positioning

Techniques will be described for coordinating uplink-based positioning to improve accuracy and to facilitate reception of uplink reference signal transmissions by participating base stations and/or LMUs. As described above, multiple-beam operations in the UE 100 or receivers may interfere with legacy uplink-based positioning since beam directions may not be aligned, particularly at receivers of neighboring cells. The positioning computation node 105 may instruct UE 100, RAN nodes 110, and/or LMUs (which may be associated with RAN nodes 110) how to proceed with an uplink-based positioning procedure so that, for example, transmit beams of UE 100 align with receive beams of the RAN nodes 110 (and/or LMUs). Downlink channel quality measurements collected by UE 100 may facilitate configuration of the uplink-based positioning procedure to achieve a desired accuracy with the positioning estimate. In addition to positioning measurements on uplink transmissions, the receivers (e.g. RAN nodes 110 or LMUs) may report beam-related information. Beam-related information may enable computation of more accurate positioning estimates based on acquired angle information, for example.

Figure 5:
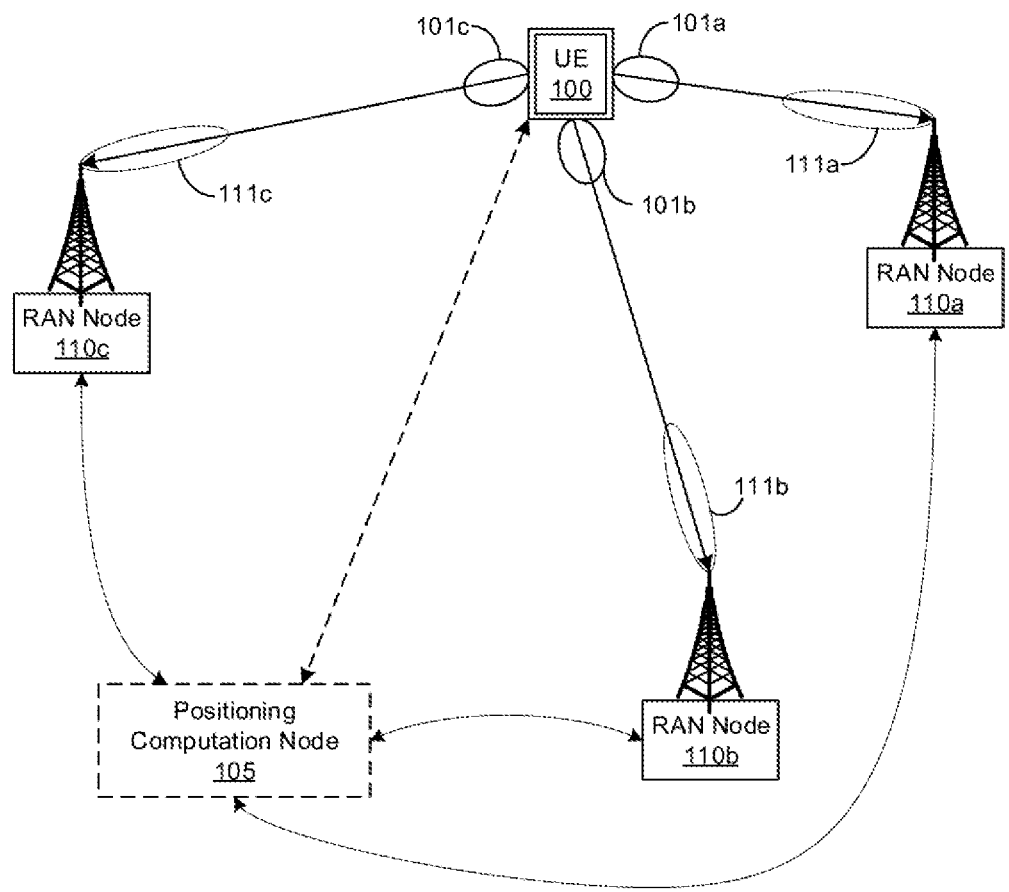
FIG. 5 is a schematic diagram of an exemplary coordinated uplink-based positioning technique.

Turning to FIG. 5, an exemplary embodiment of a coordinated uplink-based positioning technique is illustrated. As shown in FIG. 5, with uplink-based positioning, UE 100 may transmit an uplink reference signal which is received by one or more RAN nodes 110 (or LMUs). The uplink reference signal may a sounding reference signal (SRS). However, it is to be appreciated that the uplink reference signal may any uplink signal transmitted by UE 100 for which a receiver could compute a positioning measurement. The positioning measurements may be timing-based (e.g., TOA, Relative TOA (RTOA), UTDOA, etc.) and/or signal strength-based (e.g. reference signal received power (RSRP), received signal strength indication (RSSI), etc.). One or more receivers of the uplink reference signal, such as RAN nodes 110, may generate positioning measurements (also generally referred to herein as uplink measurements) and report the measurements to the positioning computation node 105 in a positioning measurement report or uplink measurement report. The RAN nodes 110 may send separate (e.g. individual) reports the positioning computation node 105. Alternatively, neighboring RAN nodes 110b-c may send the measurements to a serving RAN node 110a. The serving RAN node 110a collects the measurements from the neighboring RAN nodes 110b-c and sends an aggregate report to the positioning computation node 105. The positioning computation node 105 may estimate a position of UE 100 based on the reported uplink or positioning measurements.

UE 100 may transmit the uplink reference signal via beam transmission. For instance, UE 100 may transmit the uplink reference signal on transmit beam 101a, 101b, and/or 101c as shown in FIG. 5. In another embodiment, UE 100 may transmit the uplink reference signal omnidirectionally. For instance, with operations in FR1 (i.e. NR frequency band generally below 6 GHz), the uplink may be omnidirectional whereas operations in FR2 (i.e. mmWave) may typically use narrow beams. However, it is to be appreciated that UE 100 may transmit omnidirectionally or via beams as shown in FIG. 5 regardless of the frequency band.

In the example depicted in FIG. 5, in one aspect, the RAN nodes 110a-c may receive the uplink reference signal from UE 100 via respective receive beams 111a-c. In addition to the positioning measurement, the RAN nodes 110 may include beam information in the measurement report (e.g. referred to as an uplink measurement report or a positioning measurement report) sent to the positioning computation node 105. The beam information may include transmit beam information corresponding to beams 101a-c and/or receive beam information corresponding to beams 111a-c. In the case of omnidirectional uplink transmission, the beam information may include only receive beam information. The beam information may include a beam index that corresponds to a predetermined beam configuration for the RAN node 110 or UE 100, observed or estimated beam parameters (e.g. AoD, AoA, beam width, etc.), and/or an antenna panel index. For instance, an antenna panel may support multiple beams. To illustrate, a transmitter or received may have two panels, which each support four beams. Accordingly, the beam information may include the antenna panel index and the corresponding beam index. Regarding observed or estimated beam parameters, angle information may be provided as two angles (e.g. horizontal (azimuth) and vertical (elevation)) in order to specify a beam in three-dimensional space.

Typically, UE 100 may maintain an appropriate beam direction with respect to a serving RAN node. However, such alignment may not be guaranteed with neighboring RAN nodes. To ensure reception of the uplink reference signal, the positioning computation node 105 may coordinate UE 100 and RAN nodes 110 to achieve alignment between transmit beams and receive beams. While shown in FIG. 5 as a separate component, it is to be appreciated that the positioning computation node 105 may be a core network node (e.g. a location server or serving mobile location center (SMLC or E-SMLC)), a radio access network node (e.g. integrated with a RAN node 110), or a component of UE 100.

To facilitate coordination, the positioning computation node 105 may collect respective configurations for RAN nodes 110 and UE 100. The configuration may include a configuration for the uplink reference signal (e.g. SRS configuration) of UE 100. In addition, the RAN nodes 110 may report respective receive beam configurations and the UE 100 may report a transmit beam configuration. To initiate an uplink-based positioning procedure, the positioning computation node 105 may send a positioning request to a network node (e.g. RAN node 110) and, in particular, a serving network node of UE 100. The positioning request, in an example, may include a desired accuracy or service level of the positioning estimate. To further facilitate positioning, the serving network node may request the UE 100 to perform channel quality measurements of the serving cell and neighbor cells. The serving network node may also inform the UE 100 of the desired accuracy or service level.

UE 100 may perform channel quality measurement (e.g. a measurement on a downlink channel or a downlink measurement) based on a received downlink reference signal from multiple RAN nodes 110. The downlink reference signal may be a channel state information reference signal (CSI-RS), a synchronization signal block (SSB), a tracking reference signal (TRS), a positioning reference signal (PRS), and/or any other downlink signal by which the channel quality may be measured. Downlink reference signal from a plurality of RAN nodes may be measured by UE 100. However, the channel quality measurements reported may be a subset of a total number of network nodes measured. The subset selected for reporting may be based, in part, on the desired positioning accuracy. For instance, UE 100 may measure neighbor cells at a particular time and at a particular period referred to as a measurement time window. During this window, UE 100 may perform channel quality measurements of those neighbor cells. This result set may be large. Accordingly, a channel quality measurement report (e.g. a measurement report on downlink channels or a downlink measurement report), which is sent to the positioning computation node 105, may not include an entirety of all measurements obtained by UE 100. The particular measurements included in the channel quality measurement report may be selected based on the desired accuracy informed by the positioning computation node 105 as well as measurement values. For instance, a measurement indicating poor channel quality from a particular network node may not be reported as a corresponding positioning measurement from that network node may not improve the positioning estimate due to the poor channel quality. In another example, the UE 100 may send a channel quality measurement report that contains channel quality measurements from many RAN nodes and, particularly, many RAN nodes with relatively good measurement quality, when a high level of accuracy is desired.

UE 100 may send, to the positioning computation node 105, a channel quality measurement report associated with the downlink reference signals received. The channel quality report may include measurements for a set of RAN nodes selected from the plurality of RAN nodes measured. The report may include, for a given downlink reference signal received from a network node of the set of RAN nodes selected, a measurement value (e.g. RSRP or pathloss measurement) with associated beam information. The beam information may include an associated transmit beam index of the network node and/or a receive beam index of UE 100.

In the case of a mobile originated location request, UE 100 may directly proceed to measure downlink channel quality and send the channel quality measurement report to the positioning computation node 105.

Based on the channel quality measurement report, the positioning computation node 105 may select a set of participating network nodes (or LMUs) from the one or more network nodes included in the report from UE 100. The positioning computation node 105 may send configuration information to UE 100 and RAN nodes 110 participating in the positioning procedure. The RAN nodes 110 may receive configuration information that enables the RAN nodes 110 to configure an appropriate receive beam for receiving the uplink reference signal transmission from the UE 100. The RAN nodes 110 may also receiving a timing indication (e.g. SFN and subframe offset) so that reception operations are aligned with the transmission. In another example, the positioning computation node 105 may only send configuration information to UE 100. The configuration information enables the UE 100 to configure uplink reference signal transmissions at particular beams at particular times and frequencies. In this example, the RAN nodes 110 may periodically perform a beam-sweeping operation to receive the uplink reference signal. With beam-sweeping, the RAN nodes 110 may cycle through a sequence of receive beams to cover all directions.

Figure 6:
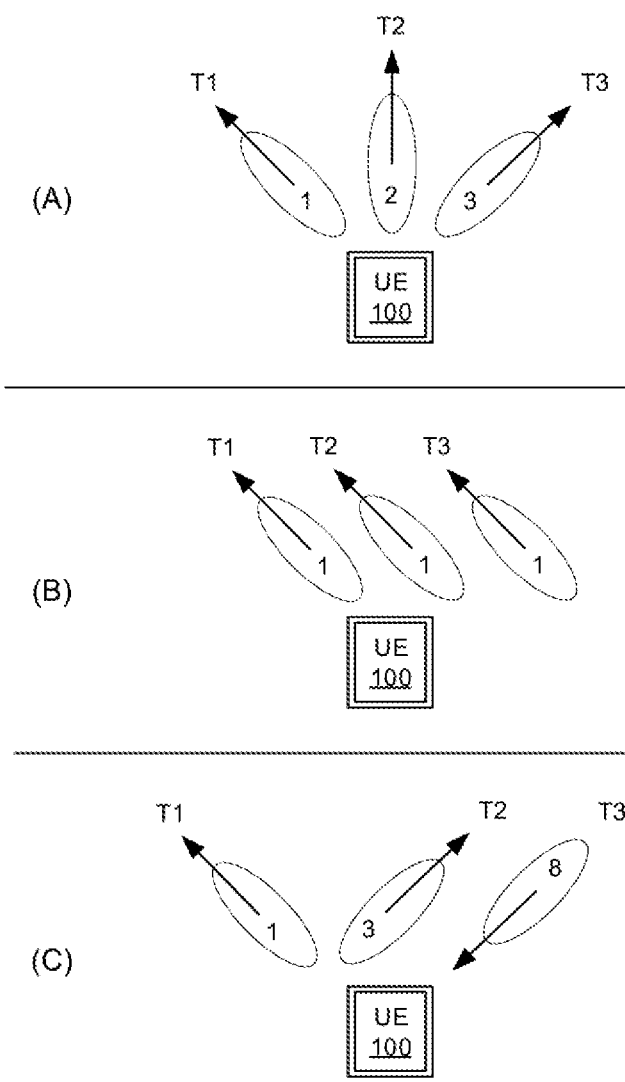
FIG. 6 is a schematic diagram of exemplary transmission beam patterns employable by the UE to transmit an uplink reference signal.

UE 100 may receive configuration information from the positioning computation node 105 that indicates beam information for the uplink reference signal transmission. The beam information, in one example, may include a beam pattern. In another example, may include the time/frequency resources allocation for the transmissions. Turning briefly to FIG. 6, various exemplary beam patterns are depicted. In (A), a sequential beam sweeping approach may be employed. With sequential beam sweeping, UE 100 may transmit using beam 1 at T1, switch to transmitting via beam 2 at T2, switch to beam 3 at T3, and so on as shown in FIG. 6. For example, this may be applicable if the UE 100 is unable to maintain beam correspondence. Beam correspondence refers to a situation where UE 100 may derive an uplink (e.g. transmit) beam based on a downlink beam (and vice versa). For example, if UE 100 receives a downlink signal on beam index 1, the uplink beam (e.g. transmit beam) may also use beam index 1. If beam correspondence is not maintained, there may be some deviation between a downlink beam direction and an uplink beam direction. Accordingly, sequential beam sweeping may be employed to overcome the deviation. In (B), a beam pattern involving a one-shot transmission with optional repetition is depicted. As shown, transmission using beam 1 may be repeated at T1, T2, and T3. In beam pattern (C), a non-sequential approach is depicted. In the particular example illustrated, UE 100 will transmit using beam 1 at T1, beam 3 at T2, and beam 8 at T3. With this approach, the transmit beams utilized for each transmit instance may correspond to a particular receive beam of a particular network node designated to receive the transmission. For example, a network generally located in the direction of beam 8 may configure a corresponding receive beam to receive the uplink reference signal at T3.

In a further aspect, a serving RAN node 110 may allocate uplink resources to UE 100 for transmission of the uplink reference signal. The allocation may be under the direction of positioning computation node 105 and/or based on the configuration information sent from the positioning computation node 105. As described above, an uplink-based positioning procedure may be configured based on downlink channel quality measurements. As such, the uplink reference signal transmission may occur within some time period from a time of measurement so that channel conditions may be assumed to be similar. For example, the uplink reference signal transmission may be scheduled to occur within a certain duration of time (e.g. within X subframes or Y radio frames) following measurement of the downlink channel. More specifically, a predetermined period of time (e.g. a time window or range) may be defined. This period may be relative to a time when the positioning computation node 105 receives the channel quality measurement report from UE 100. Thus, the uplink reference signal transmission should be scheduled so as to occur within the predetermined period of time from when the report is received. In another example, the scheduling may be determined based on a time at which the UE 100 performs the channel quality measurements. In this example, the UE 100 may include a timestamp in the channel quality measurement report.

Figure 7:
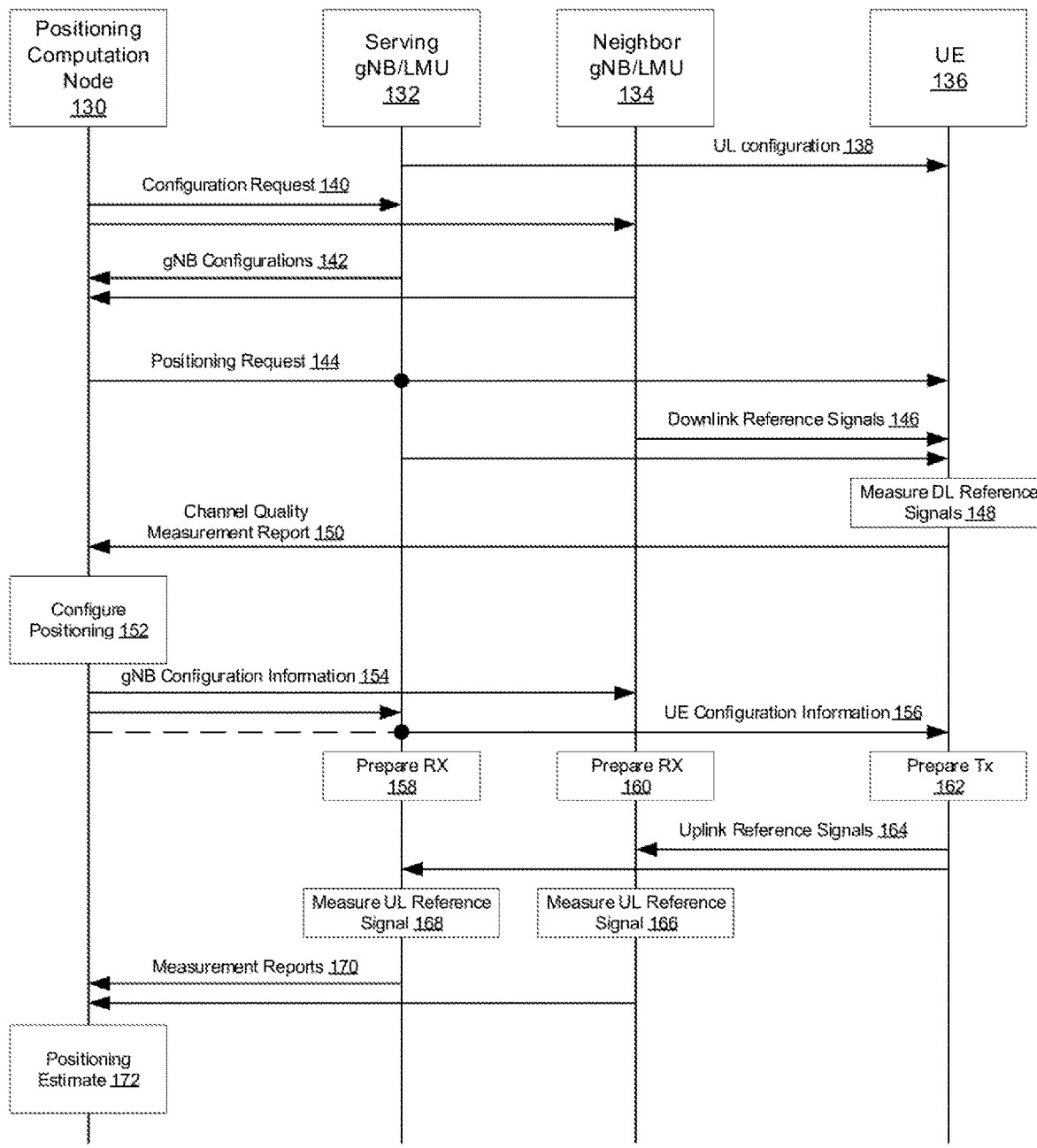
FIG. 7 is a signaling diagram of an exemplary procedure to perform coordinated uplink-based positioning in a wireless communications system.

Turning to FIG. 7, an exemplary signaling diagram for coordinate uplink-based positioning is illustrated. As shown in FIG. 7, a positioning computation node 130, which may be similar to positioning computation node 105 described above, interacts with a serving base station (gNB) or LMU 132, a neighbor base station or LMU 134, and a UE 136. The serving and neighbor base stations may be similar to RAN nodes 110 described above and UE 136 may be similar to UE 100 described above. Initially, the serving base station 132 may perform UE configuration 138. In particular, the base station 132 provides an initial configuration for uplink reference signal (e.g. SRS) transmissions of UE 136. To prepare for positioning procedures, the positioning computation node 130 may collect configurations of base stations 132, 134 and UE 136 by sending configuration requests 140 to the serving base station 132 and the neighbor base station 134. The base stations 132, 134 send gNB configurations 142 to the positioning computation node 130 in response to request 140. The gNB configurations 142 may include respective receive beam configurations of base stations 132 and 134. In one example, the serving base station 132 may include the UE configuration along with its configuration 142. The UE configuration may include the uplink reference signal configuration and a UE transmit beam configuration.

To initiate a positioning procedure, the positioning computation node 130 may send a positioning request 144 to the serving base station 132 and UE 136 (through the base station 132 for example). The positioning request 144 may indicate a desired accuracy for the positioning estimate. UE 136 receives downlink reference signals 146 from the serving base station 132 and the neighbor base station 134 as well as other neighboring base station. The UE 136 performs a channel quality measurement 148 on the received downlink reference signals. After measurement, the UE 136 sends a channel quality measurement report 150 to the positioning computation node 130. The measurement report 150 may include a subset of a total number of network nodes measured. That is, UE 136 may perform a first selection of network nodes for participation in the uplink-based positioning procedure. To illustrate further, a full set of measurements may include a large number of network nodes. To reduce signaling overhead, for example, the particular measurements included in the channel quality measurement report may be selected based on the desired accuracy. Measurements may be selected for reporting based on the measurement values. For instance, a measurement indicating poor channel quality from a particular network node may not be reported as a corresponding positioning measurement from that network node may not improve the positioning estimate due to the poor channel quality. In another example, if stringent accuracy is desired the channel quality measurement report 150 may include channel quality measurements from many network nodes and, particularly, many network nodes associated with measurements having relatively good quality. In other words, the first selection by the UE 136 may indicate a set of candidate network nodes for participation in the uplink-based positioning procedure.

Based on the channel quality measurement report 150, the positioning computation node 105 configures the positioning procedure 152. For example, the positioning computation node 105 may select one or more network nodes to participate in positioning from the nodes included in the report. This selection by the positioning computation node 105 may be based on the desired accuracy as well as measurements in the report 150. For this selection, the positioning computation node 105 may consider similar factors as UE 135 described above. Alternatively, the positioning computation node 105 may select network nodes based on a predicted ability to estimate a position with the desired accuracy. For instance, the channel quality measurement report 150 may indicate a small set of network nodes associated with relatively narrow beams (i.e. narrow beam width) and high channel quality. Positioning measurements from this small set may be sufficient to achieve a desired positioning accuracy since such positioning measurements themselves may have a higher quality. In some situations, the set of network nodes selected may include less than three nodes, particularly in situations having very narrow beams and superior channel conditions.

The positioning computation node 105 may further determine the appropriate transmit beams for UE 136 and receive beams for the network nodes along with timing information in order to align transmission and reception of the uplink reference signal. The positioning computation nodes 105 sends gNB configuration information 154 to the serving base station 132 and neighbor base station 134. The positioning computation node 105 also sends UE configuration information 156 to UE 136. In one example, UE configuration 156 may pass through serving base station 132. Further, UE configuration 156 may take the form of uplink resource allocation. In other example, the gNB configuration information 154 may include timing information and receive beam information. The UE configuration information 156 may include uplink timing information and/or transmit beam information (e.g. beam patterns) for the uplink reference signal transmission.

After receiving the configuration information, the serving base station 132 prepares for reception 158, the neighbor base station 134 prepares for reception 160, and the UE 136 prepares for transmission. In an example, the serving base station 132 and neighbor base station 134 may configure respective receive beams to receive the uplink reference signal transmission. In another example, the positioning computation node 105 may not send gNB configuration information 154 to the base stations 132 and 134. In particular, the positioning computation node 105 may not provide specific receive beam information. Rather, the base stations 132 and 134 may perform beam sweeping to cover substantially all directions in order to receive the uplink reference signal from UE 136.

The UE 136 may utilize one or more transmit beams to transmit uplink reference signals 164 to serving base station 132, neighbor base station 134, and other base stations selected for participation. The neighbor base station 134 performs a positioning measurement 166 on the uplink reference signal 164. The serving base station 132 also performs a positioning measurement 168 on the uplink reference signal 164 received. The base stations 132 and 134 send respective positioning measurement reports 170 to the positioning computation 105, which calculates a positioning estimate 172 based on the to reports 170. The reports 170 may include positioning measurement values (e.g. a positioning timing measurement or positioning signal strength measurement) along with beam information (e.g. transmit beam information and/or receive beam information).

It is to be appreciated that the above sequence described in FIG. 7 is exemplary and alternative orders may be employed.

Figure 8:
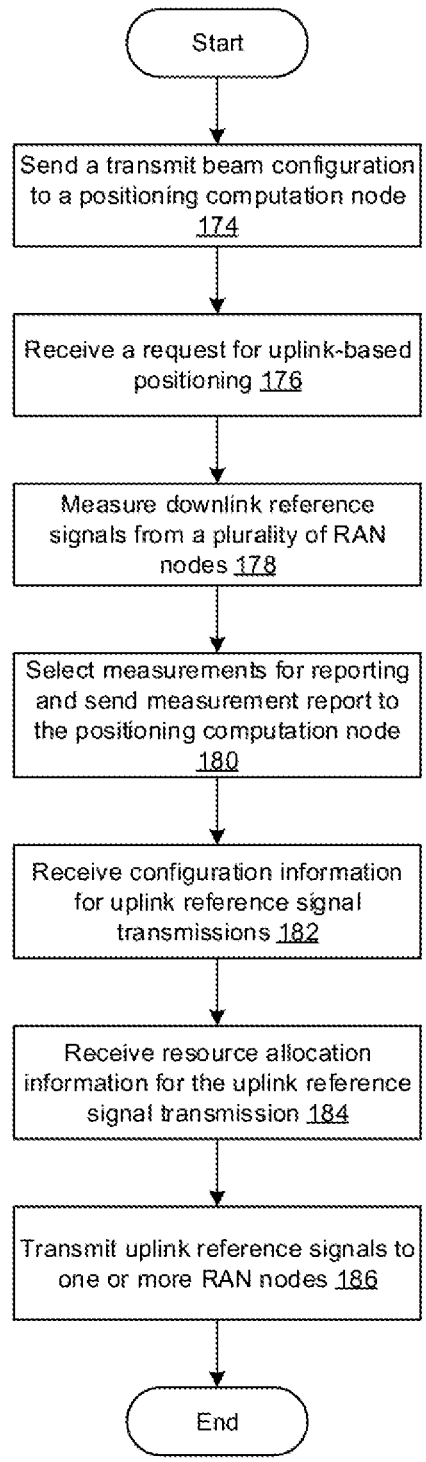
FIG. 8 is a flow diagram of a representative method of performing uplink-based positioning at a wireless communications device.
Figure 9:
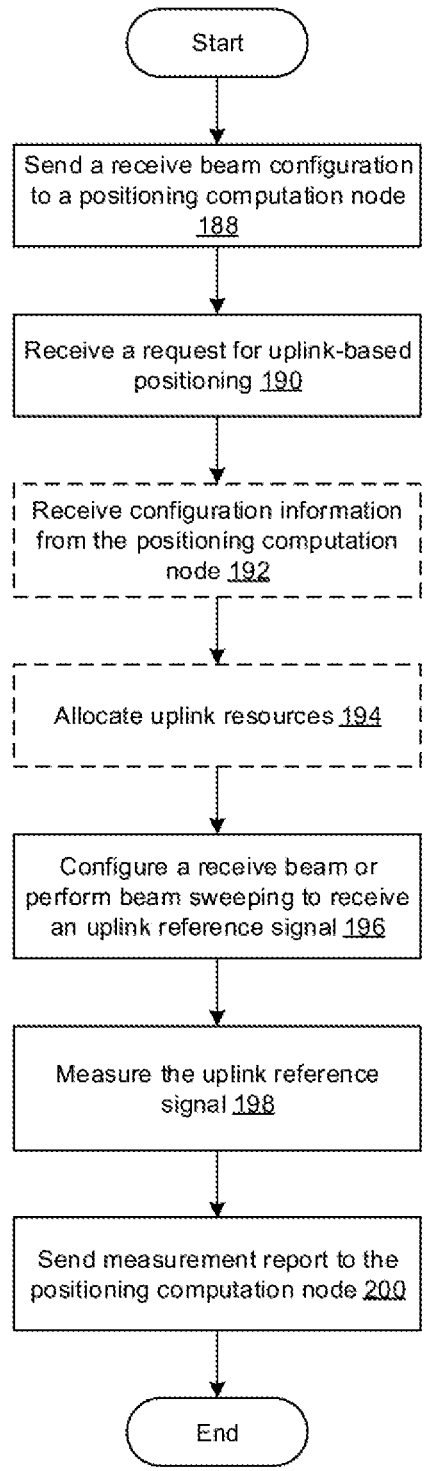
FIG. 9 is a flow diagram of a representative method of performing uplink-based positioning at a network node.
Figure 10:
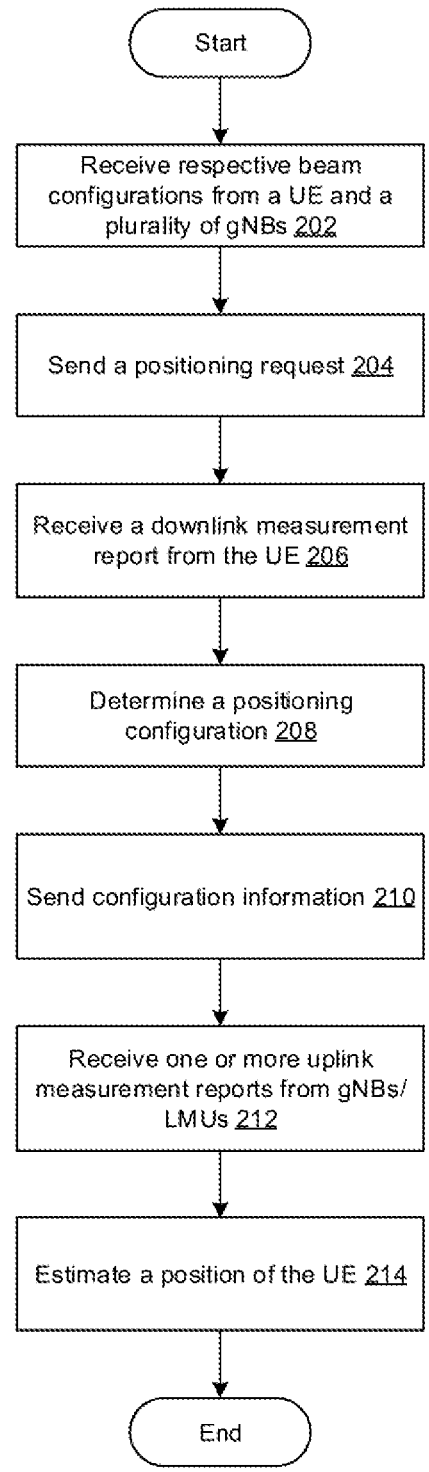
FIG. 10 is a flow diagram of a representative method of performing uplink-based positioning at a positioning computation node.

FIGS. 8-10 illustrate an exemplary process flows representing steps that may be embodied by UE 100, RAN node 110, and positioning computation node 105 respectively. Although illustrated in a logical progression, the illustrated blocks of FIGS. 8-10 may be carried out in other orders and/or with concurrence between two or more blocks. Therefore, the illustrated flow diagrams may be altered (including omitting steps) and/or may be implemented in an object-oriented manner or in a state-oriented manner.

FIG. 8 illustrates a representative method of performing uplink-based positioning. The method of FIG. 8 may be carried out by a wireless communications device, such as UE 100. The logical flow may start at block 174 where the UE sends a transmit beam configuration to a positioning computation node. From the transmit beam configuration, the positioning computation node may learn the capabilities of the UE, such as which transmit beams are supported by the UE. For instance, if the UE supports many beams, having narrow beam widths for example, then angle information (e.g. AoD) may be utilized in estimating a position. However, if the UE supports beams having wide beam widths or only supports omnidirectional beams, then angle information may be as valuable or even available. Accordingly, transmit beam configuration of the UE may be used by the positioning computation node when configuring the uplink-based positioning procedure. For example, the transmit beam configuration may inform the positioning computation node as to how many positioning measurement may be needed to achieve a required accuracy.

In block 176, the UE receives a request for uplink-based positioning. The request may include a desired accuracy for the positioning estimate. The desired accuracy instructs the UE during channel quality measurement and reporting as described below. In block 178, downlink reference signals from a plurality of RAN nodes are measured. In particular, channel quality measurements are performed on the downlink reference signals. In block 180, measurements (and associated RAN nodes) are selected for reporting and a channel quality report is sent to the positioning computation node. The selection of nodes for which measurements are to be reported may be based on the desired accuracy and the measurement values themselves. For instance, RAN nodes associated with measurements indicating channel quality below a predetermined threshold may be discarded. In block 182, the UE receives configuration information for uplink reference signal transmission. The configuration information may include transmit beam information and/or a transmit beam pattern. In block 184, the UE receives resource allocation information that schedules uplink resources to be utilized for the uplink reference signal transmission. The resources scheduled may be constrained in the time domain relative to a time at which channel quality measurements are taken and/or reported to ensure channel conditions remain relatively similar at the time at which the uplink reference signal is transmitted. In block 186, the UE transmit uplink reference signals to one or more RAN nodes in accordance with the configuration information and the resource allocation information.

FIG. 9 illustrates a representative method of performing uplink-based positioning. The method of FIG. 9 may be carried out by a network node, such as a RAN node 110 or an LMU. The logical flow may start at block 188 where the network node sends a receive beam configuration to a positioning computation node. Similar to UE transmit beam configuration describe above, the positioning computation node may learn the capabilities of the network node from the receive beam configuration. For example, the positioning computation node may learn a number of beams supported and respective beam widths. This information enables the positioning computation node to configure the uplink-based positioning procedure to achieve a target accuracy. In block 190, network node receives a request for uplink-based positioning. The request may include a desired accuracy for the positioning estimate. In block 192, the network node may optionally receive configuration information for receiving an uplink reference signal transmission from a wireless communications device. The configuration information may include receive beam information to utilize to receive the uplink reference signal transmission. In another example, when receive beam configuration information is not received, the network node may employ a beam sweeping operation.

In block 194, when the network node is a serving network node, the network node allocates uplink resources to the wireless communications device. The resources scheduled may be constrained in the time domain relative to a time at which channel quality measurements are taken and/or reported to ensure channel conditions remain relatively similar at the time at which the uplink reference signal is transmitted. In accordance with this example, the serving network node may still receive configuration information in block 192 even when beam sweeping is employed. In this situation, the configuration information informs the serving network node of appropriate timing information so as to schedule the uplink transmission within a predetermined period of time.

In block 196, the network node configures a receive beam or performs beam sweeping to receive the uplink reference signal from the wireless communications device. In block 198, the network node performs a positioning measurement (e.g. timing-based and/or signal-strength-based) on the uplink reference signal received. In block 200, the network node sends a positioning measurement report to the positioning computation node. The measurement report may include a measurement value and beam information. The beam information may include transmit beam information and/or receive beam information.

FIG. 10 illustrates a representative method of performing uplink-based positioning. The method of FIG. 8 may be carried out by a positioning computation node, such as positioning computation node 105. The logical flow may start at block 202 where the positioning computation node receive respective beam configurations from a UE and a plurality of base stations and/or LMUs. As described above, the beams configurations inform the positioning computation node of the capabilities (e.g. supported beams, respective beam widths, etc.) of the UE and the base stations. For instance, the capabilities may factor into how many positioning measurements should be collected to compute a position estimate within a target accuracy.

At block 204, the positioning computation node may issue a positioning request that includes a desired accuracy. The desired accuracy may instruct the UE during channel quality measurement and reporting as described above. In block 206, the positioning computation node may receive a channel quality measurement report from the UE. The channel quality report includes channel quality measurements for a set of to network nodes and associated beam information. In block 208, the positioning computation node determines a positioning configuration for an uplink-based positioning procedure, including selecting a set of nodes that will participate in the procedure, based at least in part on the channel quality measurement report. This selection by the positioning computation node may be based on the desired accuracy as well as measurements in the report. For example, the positioning computation node may select network nodes associated with good channel conditions so that higher quality positioning measurements are collected. In block 210, configuration information is sent to the network nodes participating in the positioning procedure and to the UE. The configuration information may include transmit and receive beam information for the uplink reference signal transmission. The configuration information may also include timing information to align transmission and reception at the UE and the network nodes. In another example, the networks nodes may employ beam sweeping to receive the uplink reference signal. Accordingly, the configuration information sent to the network nodes may not include receive beam information. In block 212, the positioning computation node receives one or more positioning measurement reports or uplink measurement reports from the participating network nodes. The reports include positioning measurements (e.g. timing-based and/or signal-strength-based) and beam information. In block 214, the positioning computation node estimate a position of the UE based on the measurement reports received.

Conclusion

Although certain embodiments have been shown and described, it is understood that equivalents and modifications falling within the scope of the appended claims will occur to others who are skilled in the art upon the reading and understanding of this specification.

What is claimed is:

1. A method, performed by a wireless communications device, for uplink-based positioning, comprising:
receiving configuration information for uplink-based positioning from a positioning computation node, wherein the configuration information enables coordination between transmit beams at the wireless communications device and respective receive beams at a set of participating radio access network (RAN) nodes; and
transmitting an uplink reference signal to the set of participating RAN nodes in accordance with the configuration information.

2. The method of claim 1, further comprising:
receiving a request for positioning from the positioning computation node;
measuring downlink reference signals received from a plurality of RAN nodes; and
transmitting a channel quality measurement report, associated with the downlink reference signals received, to the positioning computation node.

3. The method of claim 2, wherein the request for positioning further indicates a desired accuracy.

4. The method of claim 2, wherein transmitting the uplink reference signal occurs within a predetermined time period from the measuring of the downlink reference signals or the transmitting of the channel quality measurement report.

5. The method of claim 2, further comprising selecting a set of RAN nodes from the plurality of RAN nodes for inclusion in the channel quality measurement report,
wherein the selecting of the set of RAN nodes is based on the desired accuracy and/or respective measurements associated with the plurality of RAN nodes.

6. The method of claim 2, wherein the channel quality measurement report includes a measurement value with associated beam information for downlink reference signals received,
wherein the beam information includes transmit beam information associated with the downlink reference signals included in the channel quality measurement report and/or receive beam information of the wireless communications device.

7. The method of claim 1, further comprising receiving resource allocation information from a serving RAN node for transmitting the uplink reference signal to the set of participating RAN nodes.

8. The method of claim 1, wherein the configuration information indicates a beam pattern for transmitting uplink reference signals to the set of participating RAN nodes, and the method further comprising sending a transmit beam configuration of the wireless communications device to the positioning computation node.

9. A method for uplink-based positioning performed by a radio access network (RAN) node, comprising:
receiving configuration information for uplink-based positioning from a positioning computation node, wherein the configuration information enables coordination between a transmit beam of an uplink reference signal from a wireless communications device and a receive beam at the RAN node;
configuring the receive beam at the RAN node to receive the uplink reference signal from the wireless communications device in accordance with the configuration information;
measuring the uplink reference signal received; and
sending a positioning measurement report for the uplink reference signal received to the positioning computation node.

10. The method of claim 9, wherein the configuration information indicates at least beam information for receiving the uplink reference signal.

11. The method of claim 9, wherein the positioning measurement report includes a timing measurement, a power measurement, and/or beam information for the uplink reference signal received.

12. The method claim 9, further comprising allocating uplink resources to the wireless communications device based on the configuration information,
wherein the configuration information includes timing information and resources are allocated to the wireless communications device so that uplink reference signal transmissions occur in accordance with the timing information.

13. The method of claim 9, wherein sending the positioning measurement report further comprising collecting measurement reports from one or more neighboring RAN nodes and sending an aggregate measurement report to the positioning computation node.

14. The method of claim 9, further comprising sending a receive beam configuration of the RAN node to the positioning computation node.

15. A method for uplink-based positioning performed by a positioning computation node, comprising:
- receiving a channel quality measurement report from a wireless communications device that provides measurements of downlink reference signals from a set of network nodes;
- determining a configuration for uplink-based positioning, based on the channel quality measurement report from the wireless communications device, wherein the configuration enables coordination between transmit beams of uplink reference signals from the wireless communications device and respective receive beams by one or more network nodes selected from the set of network nodes;
- sending first configuration information to the one or more network nodes selected and second configuration information to the wireless communications device;
- receiving respective positioning measurement reports, associated with uplink reference signal transmissions by the wireless communications device, from the one or more network nodes; and
- estimating a position of the wireless communications device based on the positioning measurement reports.

16. The method of claim 15, wherein the configuration further includes a threshold time within which transmission of the uplink reference signals occurs, the threshold time is defined based on one of a time when the channel quality measurement report is received or a time at which channel quality measurements by the wireless communications device occurred.

17. The method of claim 15, further comprising:
- receiving respective beam configurations from the wireless communications device and the set of network nodes; and
- sending a positioning request to a serving network node of the wireless communications device, wherein the positioning request indicates a desired accuracy.

18. The method of claim 15, wherein determining the configuration information further comprises selecting the one or more network nodes participating in the uplink-based positioning based on the channel quality measurement report from the wireless communications device.

19. The method of claim 15, wherein the second configuration information indicates uplink timing information and/or transmit beam information for one or more uplink reference signal transmissions from the wireless communications device.

20. The method of claim 15, wherein the first configuration information indicates respective timing information and receive beam information for the one or more network nodes participating in the uplink-based positioning.

* * * * *